March 21, 1939. H. C. STEPHENS ET AL 2,151,645
METHOD AND MEANS FOR DEAERATING AND IRRADIATING LIQUID FOOD PRODUCTS
Original Filed April 13, 1936   3 Sheets-Sheet 1
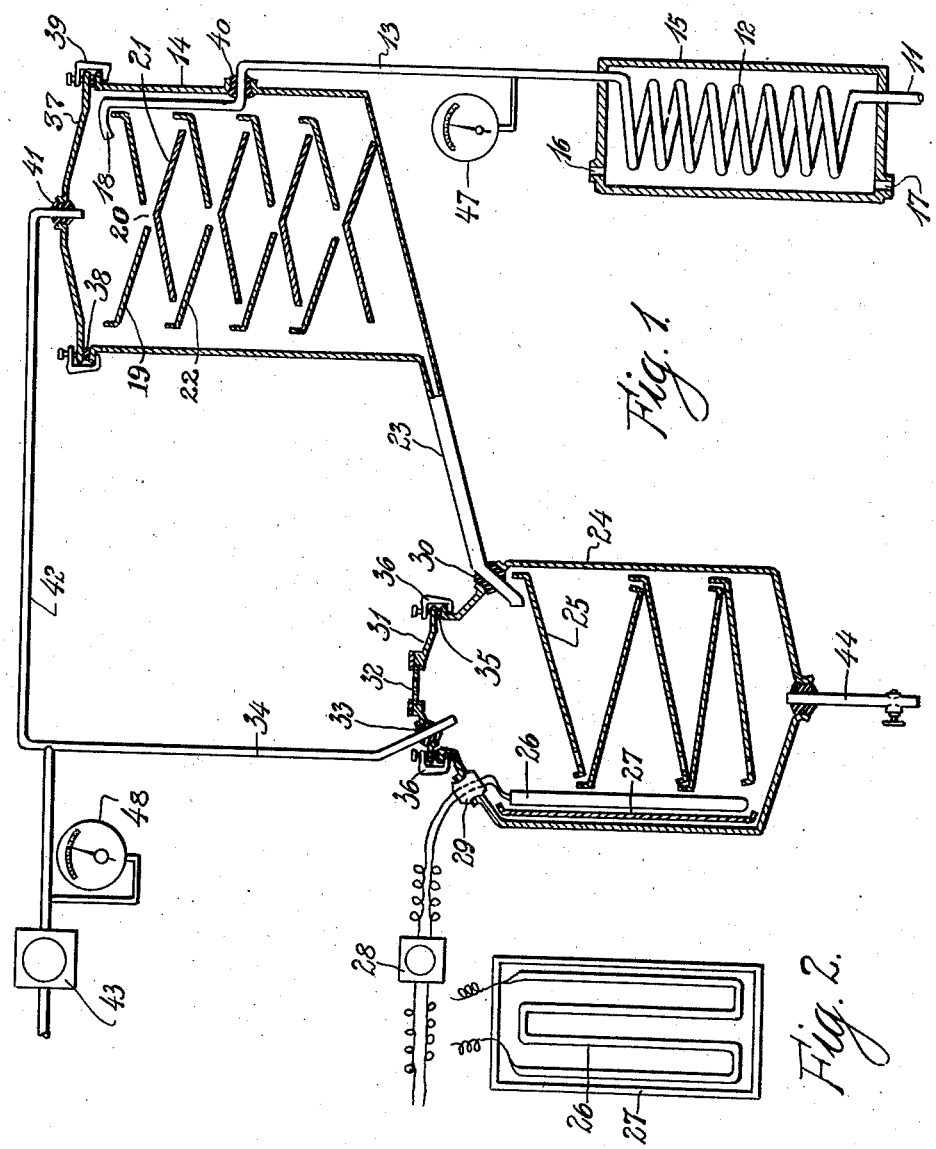
Henry C. Stephens
Stedman B. Hoar.
INVENTORS.
BY Roger Sherman Hoar
ATTORNEY.

March 21, 1939.  H. C. STEPHENS ET AL  2,151,645
METHOD AND MEANS FOR DEAERATING AND IRRADIATING LIQUID FOOD PRODUCTS
Original Filed April 13, 1936  3 Sheets-Sheet 3

Henry C. Stephens
Stedman B. Hoar
INVENTORS.

BY Roger Sherman Hoar
ATTORNEY.

Patented Mar. 21, 1939

2,151,645

UNITED STATES PATENT OFFICE 2,151,645

METHOD AND MEANS FOR DEAERATING AND IRRADIATING LIQUID FOOD PRODUCTS

Henry C. Stephens and Stedman B. Hoar, Orange, Calif., assignors to Natural Food Products Company, Orange, Calif., a corporation of Delaware Application April 13, 1936, Serial No. 74,174
Renewed September 30, 1938

15 Claims. (Cl. 99—218)

Our invention relates to new and useful improvements in method and means for deaerating and irradiating liquid food products.

This present application is a continuation-in-part, as to all common subject-matter, of our copending application of the same title, Serial No. 725,180, filed May 11, 1934, and of the applications upon which it in turn was based, namely: Serial No. 619,022, for Improvements in method and means for preparing and packing liquid food products, filed June 24, 1932, and Serial No. 626,240, for Improvements in cascade deaerator, filed July 29, 1932, which resulted in Patent No. 2,020,250.

We have found that the advantages of ultra-violet irradiation in vacuo are to some extent offset by the creation of ozone odors in some processed liquids, if there is still present in the liquid any oxygen at the time of irradiation. Not only does the presence of the ozone thus created impart a lasting bad flavor to certain liquid food products, which flavor is practically impossible to eliminate even by the subsequent removal of the ozone, but it also has a tendency to render the rarefied air in the deaerator less pervious to the ultra-violet rays, and thus retard their beneficial effect on the liquid.

Accordingly it is a principal object of our invention to provide for at least a considerable portion of deaeration before irradiation, and in other respects to irradiate the liquid at such time and when it is in such condition as to derive the maximum good therefrom.

The copending application of Henry C. Stephens, Serial No. 619,022, filed June 24, 1932, shows and describes precooling before simultaneous deaeration and irradiation. Our Patent No. 2,020,250, which was copending with the parent case of this present application, and of which said parent case was a continuation-in-part, shows and describes deaeration before irradiation. The process and apparatus actually used by us combines these steps in the order: (1) precooling, (2) deaeration, (3) irradiation. In our complete process and apparatus, we have found that the combination of these three steps in that order is most vital to the success of our product. But, being doubtful whether either of the above mentioned copending applications would alone support claims to that combination, we were compelled to file said parent case.

This present application amplifies some of the details of that case, and supports some of them by amplified showings.

Our invention consists in the novel steps, and in the novel parts, and in the combinations and arrangements thereof which are defined in the appended claims.

Throughout the description, the same reference number is applied to the same member or to similar members.

Figure 1 is a vertical section of an apparatus exemplifying our invention.

Figure 2 is an elevation of the lamp and mirror of Figure 1, as viewed from the right in that figure.

Figure 3:
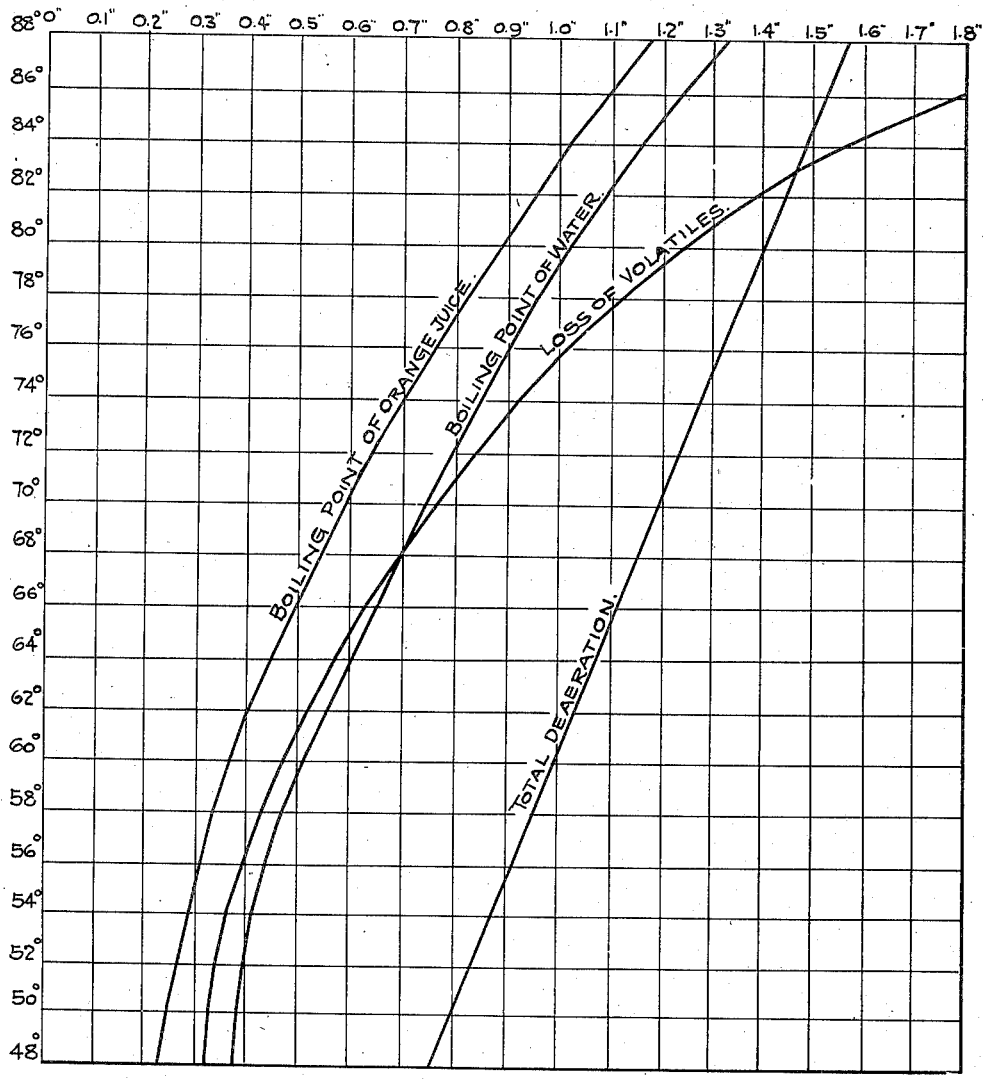
Figures 3 and 4 are charts, which will be more particularly described hereinafter.

Referring to Figure 1, and beginning at the lower right-hand corner thereof, we see that 11 is a pipe which leads the liquid from a source (not shown) upward through a cooling coil 12, and thence through a pipe 13 into a deaerator 14.

The coil 12 is located within a cooling chamber 15, through which cold water, or brine, or other cooling medium is circulated in any convenient manner. The importance of having the liquid pass upwardly through the cooling coil lies in the fact that this keeps the coil always full of liquid, and thus ensures maximum efficiency. Also the upward passage assists whatever form of entrance trap (not shown herein) may be used, in preventing the admission of air to the deaerator.

It is preferable for the cooling medium to pass downward, entering at 16 and exiting at 17; for thereby the coolest cooling medium will contact the coolest cooled liquid, thus increasing the extent of cooling.

Pipe 13 terminates in a spray-nozzle 18 within the deaerator 14.

The liquid on emerging from this spray-nozzle into the deaerator, falls upon an inverted aluminum cone 19. The liquid runs through a hole 20 at the apex of this cone onto the apex of an erect cone 21. It falls from the outer edge of this cone onto the inverted cone 22, and so on through an alternate series of inverted and erect cones until it reaches the bottom of the tank 14.

Therefrom it passes, by means of pipe 23, into the irradiating tank 24, where it falls successively upon inclined vanes 25, down over which, as it is by now thoroughly deaerated, it passes in a thin film which is exposed to the rays of an ultra violet lamp 26, backed by a reflector 27.

The lamp and its reflector are shown edgewise in Figure 1, but are shown in Figure 2 as viewed from the right in Figure 1. The reflector is preferably of sheet aluminum, coated with aluminum-oxide.

Ultra-violet rays of short hard wavelength, direct or thus reflected, have the power to penetrate the cascading film of liquid, even though a considerable vacuum distance separates the lamp from the liquid. This light treatment greatly increases the shelf life of the liquid.

The lamp uses ordinary electric current from a lamp-socket, after being stepped up to 3000 volts by a transformer 28. The wires enter the tank through a rubber stopple 29. The entrance of pipe 23 is similarly protected by a rubber stopple 30.

The cover 31 to the tank 24 is fitted with a glass window 32, and a rubber stopple 33 for the entrance of exhaust pipe 34. The cover is secured to the tank with a gasket 35 and clamps 36.

Similarly deaerator tank 14 is sealed by a cover 37, and gasket 38, by means of clamps 39. Stopple 40 is provided for the entrance of pipe 13, and stopple 41 is provided for the exit of exhaust-pipe 42.

A vacuum pump 43, preferably a motor driven Kinney pump capable of exhausting to an absolute pressure preferably ½" Hg or less, serves to exhaust both tanks.

The deaerated and irradiated liquid gathers in the bottom of tank 24, and is drawn off as desired, through pipe 44.

It is to be noted that the liquid food-product to be treated by our apparatus is first precooled in cooling-chamber 15, then is deaerated in tank 14, and then is irradiated in tank 24.

47 is a temperature gauge, and 48 is a pressure gauge, which elements were implied in the parent case.

It is to be understood that any of the hereinabove described parts of our apparatus may be supplanted by some other mechanism which will accomplish the same step in our process, without departing from the spirit of our invention.

Turning now to the chart which forms Figure 3, we see that its abscissas represent pressure in inches of mercury, and that it ordinates represent temperatures in degrees Fahrenheit of the liquid being processed. This chart bears four plotted curves, as follows:

The curve labeled "Boiling point of water" is well-known. It represents the pressure-temperature combinations at which water will boil.

The curve labeled "Boiling point of orange juice" represents the pressure-temperature combinations at which the residual liquid in Valencia orange-juice will boil, after deaeration and complete loss of volatiles.

The curve labeled "Loss of volatiles" represents the pressure-temperature combinations at which maximum loss of the aromatic volatiles from citrus juices occurs. Although based upon experimentation, its location can at best be merely approximate.

The curve labeled "Total deaeration" represents the pressure-temperature combinations at which, and to the left of which, total deaeration is possible.

This phenomenon of the existence of a critical point of total deaeration was totally unpredictable, and in fact its non-existence was clearly indicated. Prior experimentation, with pressures attainable by ordinary commercial vacuum-pumps, indicated that total deaeration was attainable only at absolute zero pressure; except, of course, by raising the temperature to the boiling point. Boiling the liquid is obviously undesirable. Absolute zero is itself unattainable, and any near approach to it is commercially non-feasible. Accordingly prior art experimentors stopped off at pressures in the vicinity of 2" Hg, assuming that any further increase in vacuum would vary the percentage of extracted air only as a matter of degree.

Figure 4:
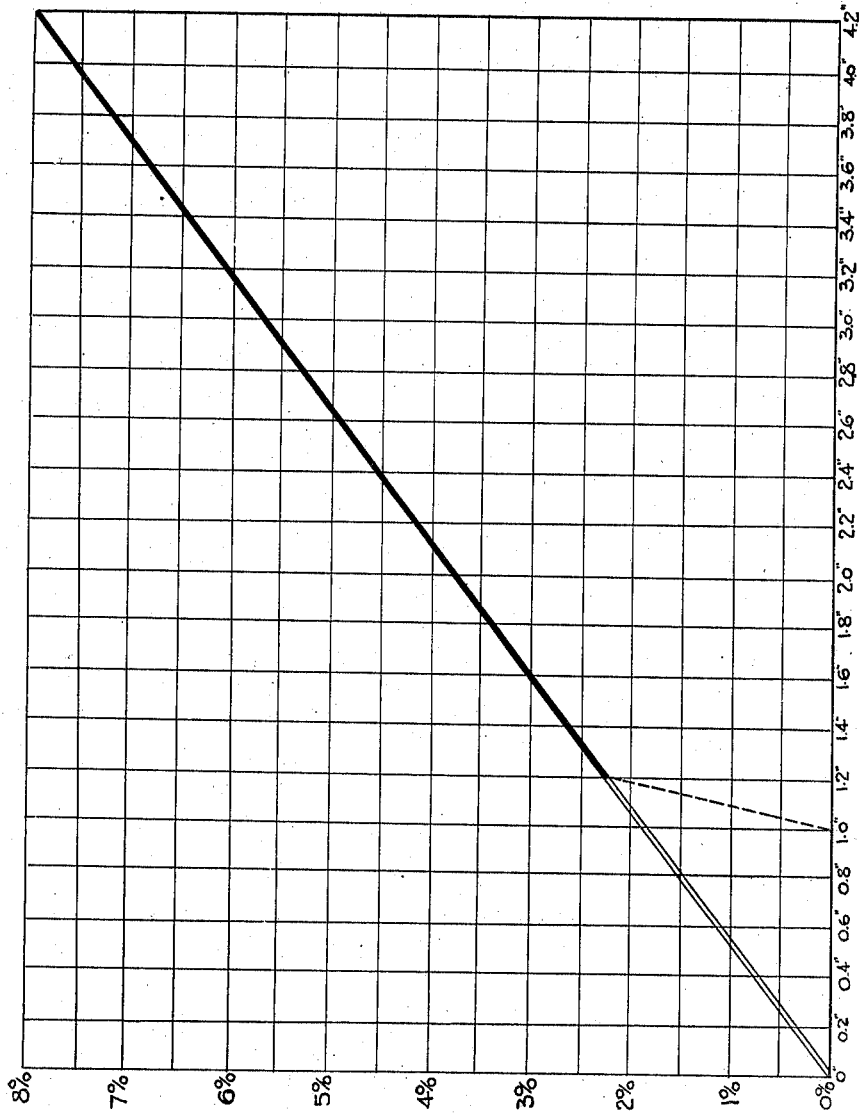

To illustrate the extreme plausibility of this prior art belief, we append the chart of Figure 4, in which the abscissas are pressure in inches of mercury and the ordinates are percentage of remaining air (the quantity of air at atmospheric pressure being taken at 100). The experiment was performed on Valencia orange-juice at 60° Fahrenheit, under strict laboratory conditions, and confirms our conclusions based on much earlier commercial deaeration.

In Figure 4, the solid black line represents the asymptotically determined remaining air, which would remain after 100% efficient deaeration, at the pressure in question. This much of the curve lies within the range of pressures feasibly producible by the ordinary commercial vacuum pump (i. e., from 5" Hg to 2" Hg). The double line shows that this solid black curve would, if extrapolated, pass directly through the origin of coordinates; thus clearly indicating that complete deaeration is unattainable even in the laboratory, and that commercially it is not even approachable.

But the dotted line shows the true facts, namely that the actual curve, instead of following the predicted double line, takes a sudden drop, and crosses the X-axis almost vertically at 1" Hg.

Similar curves can be plotted for other juice-temperatures, and each will show a critical pressure of complete deaeration for that temperature. These critical temperature-pressure combinations have been collected to form the "total deaeration" curve of Figure 3.

The "total deaeration" curve, thus derived, is based upon experiments performed on Valencia orange juice of Brix 13°. Experiments with Valencia orange juice of other degrees of sweetness, and with grapefruit juice and navel orange juice, produce the same curve, and indicate that it is substantially applicable to other liquid food products.

Figure 3 illustrates the importance of precooling the juice well below 70° F., in order to have a wide enough range, between the Scylla of incomplete deaeration and the Charybdis of loss of volatiles and even boiling, so as to permit the fluctuations of pressure inevitably resulting from the fluctuations of juice-flow which are unavoidable in commercial practice.

The "loss of volatiles" curve of Figure 3, although its exact nature has not yet been theoretically determined, is somewhat analogous to a boiling-point curve: that is to say, like the curve of boiling-point of water, it is preceded (to its right) by curves of various percentages of vapor that saturated air, extracted therefrom, can hold. These additional curves, although quantitatively derivable mathematically for water vapor, and although qualitatively known to exist for citrus juices and other liquid food products, are not quantitatively known with sufficient exactness in this connection, to plot them on Figure 3. Nor is this necessary. For, inasmuch as these water-vapor curves cross the line of total deaeration at a slant, and as the volatile line is even more inclined than the water boiling-point line, it follows that these curves of vaporization would cross the line of total deaeration at even more of a slant than the curves of vaporization of water.

Accordingly it follows that, the lower the temperature of the liquid, the less not only will be the danger of a boiling away of the volatiles due to a slight pressure-drop due to fluctuation in juice-flow, but also will be the less loss of volatiles due to vaporization of volatiles at the temperature-pressure combination in question. Hence the importance of precooling.

Commercial practice has verified these theoretical considerations. A number of years of commercial processing of various liquid food products have incontrovertibly demonstrated that when we precooled we always retained volatiles which we always lost when we did not precool. This was demonstrated not only by the fact of the superior taste of precooled juice, but also by the fact that water used as a condenser for the exhaust from our apparatus picked up substantial flavor from non-precooled liquid, and practically none from precooled liquid.

Also, if liquid which has been totally deaerated without precooling, and liquid which has been totally deaerated with precooling, are comparatively subjected to lower and lower pressures at any same temperature, the latter will first exhibit visual signs of boiling, thus indicating its retention of these volatiles which boil at a higher pressure than does the basic liquid.

A further reason for precooling is that, at lower temperatures, and the consequent lower pressures necessary to secure total deaeration, the inherent capacity-limitations of even the best commercial pumps obtainable constitute a "buffer" against the fluctuation in juice-flow causing a pressure-drop dangerously close to the boiling-point lines.

There are two further reasons for precooling, and particularly for precooling to below 70° F. In the first place, due to the fluctuation of the natural air temperature during the orange season, precooling to somewhere near the lower limit of this fluctuation is advisable, so as to ensure uniformity of product. Secondly, chilling the juice immediately after extraction and then holding it chilled until processing has been completed, is advisable to retard the growth of organisms until they have been killed.

Both this consideration of retarding the growth of organisms, and the consideration securing a low enough pressure to attain complete deaeration without the danger of too great an additional pressure-drop, are considerably interlocked with the fact that the process set forth in this specification is continuous.

This process has enabled us to accomplish the deaeration of a minimum of 120 gallons of liquid per hour with vanes 24 of a size 24" long by 12" wide, and all other parts in proportion. It gives a continuous operation, taking about 15 seconds in deaerator 14. This is much more rapid than comparable batch operation.

In a continuous process, the constant flow of undeaerated liquid will keep furnishing air to occupy the capacity of the pump, and thus tend to prevent the inevitable drop of pressure toward the boiling-point, which would occur in a batch system, upon completion of deaeration.

Having the irradiation take place after practically all of the deaeration has been completed is important for the reason than oxygen exposed to ultra-violet rays turns to ozone, which not only filters out the rays, thus interfering with further irradiation, but also imparts a peculiar and disagreeable taste and odor to the liquid.

And, even though the liquid is completely deaerated before it reaches the step of irradiation in vacuo; yet, unless it has been precooled, it will boil in vacuo and give off fumes, which would cut off the ultra-violet light and thus interfere with the irradiation.

Accordingly in view of the above, the importance of the order in which we employ cooling, deaeration and irradiation in vacuo, is readily evident.

In the claims, wherever equations are given, "T" will represent the temperature in degrees Fahrenheit, and "P" the pressure in inches of mercury.

The equation for the curve of complete deaeration is:

$$P = 0.02T - 0.2$$

The curve of boiling point of water, calculated from already-known data is:

$$P = 0.3954 - 0.015375T + 0.0002909T^2$$

This equation is sufficiently close for all practical purposes within the range with which the present problem is concerned.

The curve of the boiling point of orange juice has been empirically determined to be very closely approximated by the following equation:

$$P = 0.7650 - 0.0305T + 0.0004T^2$$

In the claims, all temperatures are given in degrees Fahrenheit.

In the claims the term "simple deaeration" will be used, for brevity, to mean the removal of dissolved, occluded and entrained air by the use of vacuum, without the substitution of any other gas.

Having now described and illustrated one form of our invention we wish it to be understood that our invention is not to be limited to the specific form or arrangements of parts hereinbefore described, except in so far as such limitations are specified in the appended claims.

We claim:

1. In a method for deaerating a liquid food product, the steps which consist in continuously filming the liquid through a vacuum chamber wherein there is maintained a pressure between $P = 0.02T - 0.2$ (in which P is the pressure within the chamber in inches of mercury, and T is the temperature Fahrenheit of the liquid), and the maximum pressure at which boiling of the liquid occurs at said temperature, and, still under vacuum, exposing the thus completely deaerated liquid to ultra-violet irradiation in a second vacuum chamber.

2. In a method for deaerating a liquid food product, the steps which consist in continuously introducing the liquid into a vacuum chamber wherein there is maintained a pressure at or below $P = 0.02T - 0.2$, in which P is the pressure within the chamber in inches of mercury, and T is the temperature Fahrenheit of the liquid, said temperature being below 70°, and therein maintaining the air-containing liquid in a state of substantial surface exposure and, still under vacuum, exposing the thus completely deaerated liquid to ultra-violet irradiation in a second vacuum chamber.

3. In a method for deaerating a liquid food product, the steps which consist in continuously introducing the liquid into a vacuum chamber wherein there is maintained a pressure at or below $P = 0.02T - 0.2$, in which P is the pressure within the chamber in inches of mercury, and T is the temperature Fahrenheit of the liquid, said pressure being a vacuum of more than 29 inches of mercury, and therein maintaining the air-containing liquid in a state of substantial surface exposure and, still under vacuum, exposing the thus completely deaerated liquid to ultra-violet irradiation in a second vacuum chamber.

4. In a method for deaerating a liquid food product, the steps which consist in continuously introducing the liquid into a vacuum chamber wherein there is maintained a pressure at or below $P=0.02T-0.2$, in which P is the pressure within the chamber in inches of mercury, and T is the temperature Fahrenheit of the liquid, said temperature being below 70°, and said pressure being a vacuum of more than 29 inches of mercury, and therein maintaining the air-containing liquid in a state of substantial surface exposure and, still under vacuum, exposing the thus completely deaerated liquid to ultra-violet irradiation in a second vacuum chamber.

5. In a method of deaerating a liquid food product, the steps which consist in first precooling the liquid, and then continuously introducing the liquid into a vacuum chamber wherein there is maintained a pressure at or below $P=0.02T-0.2$, in which P is the pressure within the chamber in inches of mercury, and T is the temperature Fahrenheit of the liquid, said temperature being below 70°, and therein maintaining the air-containing liquid in a state of substantial surface exposure and, still under vacuum, exposing the thus completely deaerated liquid to ultra-violet irradiation in a second vacuum chamber.

6. In a method of deaerating a liquid food product, the steps which consist in first precooling the liquid, and then continuously introducing the liquid into a vacuum chamber wherein there is maintained a pressure at or below $P=0.02T-0.2$, in which P is the pressure within the chamber in inches of mercury, and T is the temperature Fahrenheit of the liquid, said temperature being below 70°, and therein maintaining the air-containing liquid in a state of substantial surface exposure said pressure being a vacuum of more than 29 inches of mercury, and, still under vacuum, exposing the thus completely deaerated liquid to ultra-violet irradiation in a second vacuum chamber.

7. In a method of deaerating of liquid food product, the steps which consist in first precooling the liquid, and then continuously introducing the liquid into a vacuum chamber wherein there is maintained a pressure at or below $P=0.02T-0.2$, in which P is the pressure within the chamber in inches of mercury, and T is the temperature Fahrenheit of the liquid, said temperature being below 70°, and said pressure being a vacuum of more than 29 inches of mercury, and therein maintaining the air-containing liquid in a state of substantial surface exposure and, still under vacuum, exposing the thus completely deatrated liquid to ultra-violet irradiation in a second vacuum chamber.

8. In a method for deaerating a liquid food product, the steps which consist in continuously introducing the liquid into a vacuum chamber wherein there is maintained a pressure at or below $P=0.02T-0.2$ (in which P is the pressure within the chamber in inches of mercury, and T is the temperature Fahrenheit of the liquid); and therein maintaining the air-containing liquid in a state of substantial surface exposure without boiling; and then, still under vacuum, exposing the thus completely deaerated liquid to ultra-violet irradiation in a second vacuum chamber.

9. In a method for deaerating a liquid food product, the steps which consist in continuously introducing the liquid into a vacuum chamber wherein there is maintained a pressure between $P=0.02T-0.2$ (in which P is the pressure within the chamber in inches of mercury, and T is the temperature Fahrenheit of the liquid) and the maximum pressure at which boiling of the liquid occurs at said temperature; and therein maintaining the air-containing liquid in a state of constant surface exposure; and then, still under vacuum, exposing the thus completely deaerated liquid to ultra-violet irradiation in a second vacuum chamber.

10. In a method for deaerating a liquid food product, the steps which consist in first precooling the liquid and then continuously introducing the liquid into a vacuum chamber wherein there is maintained a pressure between $P=0.02T-0.2$ (in which P is the pressure within the chamber in inches of mercury, and T is the temperature Fahrenheit of the liquid) and the maximum pressure at which boiling of the liquid occurs at said temperature; and therein maintaining the air-containing liquid in a state of constant surface exposure; and then, still under vacuum, exposing the thus completely deaerated liquid to ultra-violet irradiation in a second vacuum chamber.

11. In an apparatus for continuously processing liquid food products, the combination of: a liquid reservoir; means for precooling the liquid; a conduit joining these two elements; a vacuum chamber containing means for maintaining the air-containing liquid in a state of substantial surface exposure; a conduit joining the precooling means to the chamber; means for exhausting the chamber to below the critical pressure at which complete simple deaeration of the liquid is possible at its temperature; a second vacuum chamber; an ultra-violet lamp playing upon the interior of the second chamber; a conduit joining the two chambers; and an exit conduit from the second chamber.

12. In an apparatus for continuously processing liquid food products, the combination of a liquid reservoir; a vacuum chamber containing means for maintaining the air-containing liquid in a state of substantial surface exposure; a conduit joining these two elements; means for exhausting this chamber to below the critical pressure at which complete simple deaeration of the liquid is possible at its temperature; a second vacuum chamber; an ultra-violet lamp playing upon the interior of the second chamber; a conduit joining the two chambers; and an exit conduit from the second chamber.

13. In a method for deaerating a liquid food product, the steps which consist in continuously introducing the liquid into a vacuum chamber wherein there is maintained a pressure at or below the critical pressure at which complete simple deaeration of the liquid is possible at the temperature of the liquid, and therein maintaining the air-containing liquid in a state of substantial surface exposure, and then, still under vacuum, exposing the thus completely deaerated liquid to ultra-violet irradiation in a second vacuum chamber.

14. In a method for deaerating a liquid food product, the steps which consist in continuously introducing the liquid into a vacuum chamber wherein there is maintained a pressure between the critical pressure at which complete simple deaeration of the liquid is possible at the temperature of the liquid and the maximum pressure at which boiling of the liquid would occur at the temperature of the liquid, and therein maintaining the air-containing liquid in a state of substantial surface exposure, and then, still under vacuum, exposing the thus completely deaerated liquid to ultra-violet irradiation in a second vacuum chamber.

15. In a method for deaerating a liquid food product, the steps which consist in first precooling the liquid, and then continuously introducing the liquid into a vacuum chamber wherein there is maintained a pressure at or below the critical pressure at which complete simple deaeration of the liquid is possible at the precooled temperature of the liquid, and therein maintaining the air-containing liquid in a state of substantial surface exposure, and then, still under vacuum, exposing the thus completely deaerated liquid to ultraviolet irradiation in a second vacuum chamber.

HENRY C. STEPHENS.
STEDMAN B. HOAR.